Oct. 15, 1957
E. P. STEPHENSON
2,809,657
AUTOMATIC LOW PRESSURE SAFETY VALVE
Filed April 2, 1954
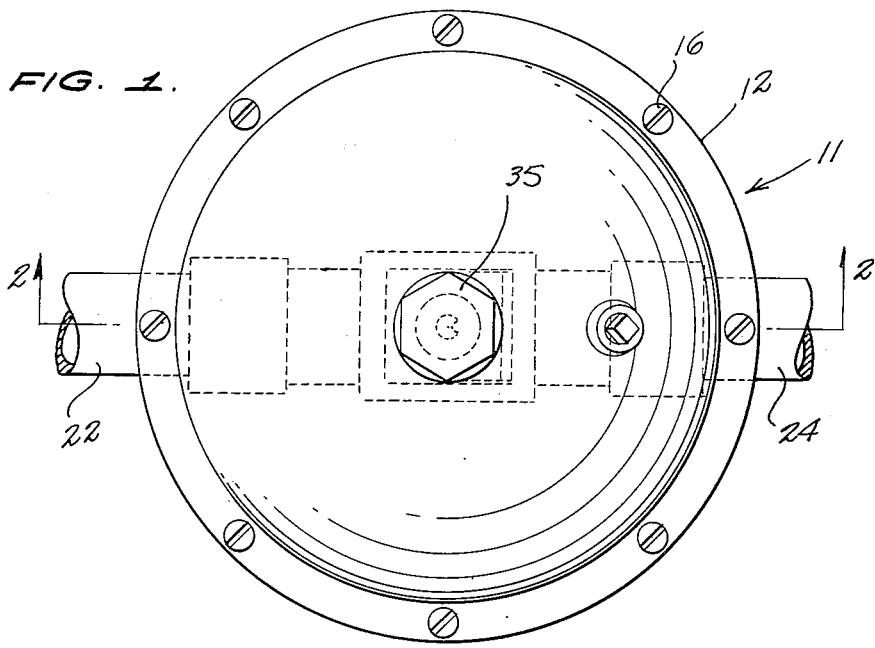
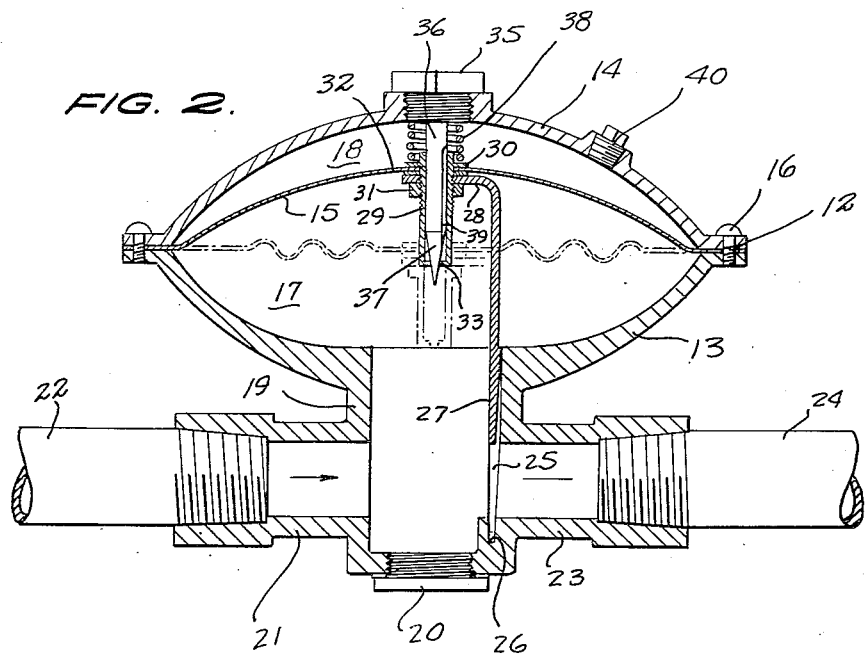
INVENTOR.
EARL P. STEPHENSON,
BY
McMorrow, Berman + Davidson
ATTORNEYS

2,809,657
AUTOMATIC LOW PRESSURE SAFETY VALVE

Earl P. Stephenson, Guthrie, Okla.

Application April 2, 1954, Serial No. 420,599

2 Claims. (Cl. 137—464)

This invention relates to valve devices for gas lines, and more particularly to an improved automatic cutoff valve for use in a gas line to automatically close the line when the gas pressure therein drops below a predetermined value.

A main object of the invention is to provide a novel and improved automatic cutoff valve for use in a gas line to automatically close the line when the pressure therein drops below a predetermined value, the improved valve being simple in construction, being reliable in operation and greatly reducing hazards which otherwise would occur due to the dropping in pressure of the gas in a line and the resultant extinguishing of the appliances connected to the line.

A further object of the invention is to provide an improved automatic cutoff valve for a gas line, said valve being inexpensive to manufacture, being sturdy in construction, and operating to automatically close the line in which it is installed when the pressure in the line drops below a predetermined minimum value, the valve remaining closed when the pressure in the line is restored until the top of the valve has been manually vented.

Further objects and advantages of the invention will become apparent from the following description and claims, and from the accompanying drawings, wherein:

Figure 1 is a top view showing an improved automatic cutoff valve constructed in accordance with the present invention.

Figure 2 is a vertical cross sectional view taken on the line 2—2 of Figure 1.

Referring to the drawings, the improved cutoff valve is designated generally at 11 and comprises a casing 12 consisting of a lower main body 13 and a top cover 14 between which is secured a flexible diaphragm 15. As shown in Figure 2, the main body 13 is concave upwardly and the top cover 14 is concave downwardly, and the diaphragm 15 secured between the peripheral portions of body 13 and cover 14 by suitable fastening means such as bolts 16, defines a first space 17 below the diaphragm and a second space 18 above the diaphragm.

The main body 13 is formed with the depending intermediate portion 19 provided at its bottom end with the manually removable, threaded cleanout plug 20. The depending portion 19 is formed at one side thereof with the inlet conduit element 21 to which may be connected the gas inlet conduit 22, and is formed opposite conduit 21 with the outlet conduit 23 to which may be connected the outlet pipe 24.

The interior wall of the depending casing portion 19 is formed adjacent the outlet conduit element 23 with the opposed vertical grooves 25 and with the bottom seating groove 26. Slidably engaged in the guide grooves 25 are the side edge portions of a valve plate 27 which is movable from the full line position thereof shown in Figure 2 to a lowered position in which its bottom edge is received in the groove 26 and whereby it seals off the conduit element 23 with respect to the remainder of casing 12. The top end of the plate member 27 is formed with the arm 28 which is apertured and which is positioned in registry with an aperture formed centrally in the diaphragm 15. Engaged through the aperture in the diaphragm 15 and through the aperture in the arm 28 is the flanged hollow nipple 29 which is axially arranged relative to the casing 12, as shown in Figure 2. The nipple 29 has the top flange 30 which engages the top surface of the diaphragm 15 around the central aperture therein and is clamped thereto by the clamping force exerted by a nut 31 threaded on the nipple 29 below the arm 28. A sealing washer of suitable deformable resilient material is designated at 32, said sealing washer being interposed between arm 28 and the bottom surface of the diaphragm 15 around the central aperture therein, as shown in Figure 2.

The nipple 29 is formed with the centrally apertured bottom wall 33. Threadedly secured centrally in the top cover element 14 is a screw plug 35 formed with the depending shank portion 36 which is slidably received in the nipple 29. The lower end of shank portion 36 is formed with the tapered point 37, said point being engageable in the central aperture in the bottom wall 33 of nipple 29 to make sealing contact therewith when the diaphragm 15 is in its upwardly flexed position, shown in full line view in Figure 2. A coiled spring 38 surrounds the shank portion 36, bearing between the screw plug 35 and the flange 30 on the nipple 29, biasing the diaphragm 15 downwardly relative to top cover element 14.

The shank member 36 is formed with the groove 39 defining a passage for gas between the pointed end 37 of said shank portion and its upper portion.

Designated at 40 is a removable screw plug which is engaged in a tapped opening in the top cover 14, said screw plug 40 being manually removable whenever it is desired to vent the upper space 18 of casing 12.

When normal gas pressure is present in the supply line 22, the diaphragm 15 will be flexed upwardly by the pressure in the line when the plug 40 is removed, whereby the diaphragm 15 assumes the position thereof shown in full line view in Figure 2. The screw plug 20 may then be replaced, since the valve point 37 makes sealing contact with the bottom wall 33 of nipple 29, whereby the pressure in upper space 18 is substantially that of atmospheric pressure and the gas pressure in the lower space 17 is that present in the gas supply line 22. Under these conditions, as shown in Figure 2, the plate 27 is supported in its elevated position, allowing free flow of the gas through the valve from the supply conduit 22 to the outlet conduit 24. When the gas pressure in the line drops below a predetermined value, the diaphragm 15 is released and is forced downwardly by the pressure exerted thereon by spring 38, as well as by the gas in the top space 18 and descends to the dotted position thereof shown in Figure 2. Thus, the plate 27 moves downwardly into engagement with the bottom groove 26 and the outlet conduit 24 is sealed with respect to the casing 12 and the supply conduit 22. When the diaphragm 15 moves downwardly the apertured nipple bottom wall 33 descends relative to the stationary valve point 37, whereby gas from the lower space 17 is allowed to flow freely through the groove 39 into the upper space 18. Thus, the pressure in the upper space 18 becomes equal to that in the lower space 17 during the time that the diaphragm is in its released position. When the normal pressure in the supply line 22 is restored, the pressure in the upper space 18 is also the same as that in the lower space 17, and the valve plate 27 remains in its closed position. In order to elevate said valve plate it is necessary to unscrew the vent plug 40, allowing the gas in the upper space 18 to exhaust to the atmosphere, whereupon an unbalance of pressure occurs causing the diaphragm 15 to be elevated by the relatively high pressure gas in the space 17. The groove 39 is relatively small in cross section, so that the discharge of gas from the lower space 17 into the upper space 18 at this time is relatively small as compared with the release of gas from the upper space 18 to the atmosphere through the opening provided by the removal of the plug 40. Thus, the diaphragm is flexed upwardly to the position thereof shown in Figure 2, causing the valve point 37 to sealingly engage the central aperture in the bottom wall 33 of nipple 29, and at the same time elevating the valve plate 27 to restore the connection between the supply conduit 22 and the outlet conduit 24. Thus, the valve is restored to the normal position thereof shown in Figure 2 and will remain in this position until an abnormal reduction in pressure occurs in the line.

While a specific embodiment of an improved cutoff valve for use in a gas line has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In an automatic cutoff valve of the type comprising a casing, a diaphragm secured in said casing and defining a first space on one side thereof and a second space on the other side thereof, and removable closure means in the casing adjacent the second space for at times venting the second space to atmosphere, respective inlet and outlet conduits connected to said first space, the inside walls of said first space being formed with guide grooves in a transverse plane adjacent to and perpendicular to the outlet conduit, a movable valve plate slidably engaged in said guide grooves, means connecting said valve plate to said diaphragm and arranged to move said plate to respectively open and close said outlet conduit responsive to flexure of the diaphragm away from and toward the first space, a tapered valve rod carried by the casing and extending parallel to said movable valve plate, and an apertured valve seat carried by the diaphragm and arranged to sealingly receive said valve rod to seal the first space relative to the second space when the diaphragm is flexed away from the first space responsive to relatively high gas pressure in said first space and to unseat from said tapered valve rod to allow communication between said spaces when the diaphragm is released, responsive to a substantial reduction in pressure in said first space.

2. In a low pressure cutoff valve for a gas line of the type comprising a casing, an inlet conduit connected to said casing, an outlet conduit connected to said casing, a flexible diaphragm secured in the casing and defining a first space on one side thereof and a second space on the other side thereof, the conduits being connected to communicate with said first space, and means for at times venting said second space to atmosphere, the inside walls of said first space being formed with guide grooves in a transverse plane adjacent to and perpendicular to the outlet conduit, a valve plate slidably mounted in said guide grooves over the entrance to said outlet conduit, means connecting said plate to said diaphragm and being arranged to open said entrance when the diaphragm is flexed outwardly relative to said first space, a stationary valve rod secured in said casing parallel to said valve plate and extending through said second space, and a seat carried by said diaphragm and having an aperture sealingly engageable with said valve rod when the diaphragm is flexed outwardly relative to said first space, said seat being disengaged from said rod to connect the spaces when the diaphragm is released responsive to reduction in gas pressure in said first space below a predetermined value, said plate being movable to seal off said outlet conduit when the diaphragm is released.

References Cited in the file of this patent

UNITED STATES PATENTS

| | | |
|---|---|---|
| 882,798 | Reid | Mar. 24, 1908 |
| 1,159,214 | Gueux | Nov. 2, 1915 |
| 1,199,152 | Bruce | Sept. 26, 1916 |
| 1,578,695 | Westrip | Mar. 30, 1926 |
| 1,636,919 | Miller | July 26, 1927 |

FOREIGN PATENTS

| | | |
|---|---|---|
| 184,112 | Switzerland | Aug. 1, 1936 |